M. FELLOWS.
ADJUSTABLE GAGE.
APPLICATION FILED FEB. 17, 1915.

1,213,134.

Patented Jan. 16, 1917.

Witnesses:
John Enders,
S. T. Lorson

Inventor:
Mel Fellows,
by George Mankle
Atty.

UNITED STATES PATENT OFFICE.

MEL FELLOWS, OF CHICAGO, ILLINOIS.

ADJUSTABLE GAGE.

1,213,134. Specification of Letters Patent. Patented Jan. 16, 1917.

Application filed February 17, 1915. Serial No. 8,793.

*To all whom it may concern:*

Be it known that I, MEL FELLOWS, a citizen of the United States, residing at Chicago, in the county of Cook, State of Illinois, have invented a new and useful Adjustable Gage, of which the following is a specification.

The object of my invention is to provide a gage which will do the work of a large number of tools of the class known as micrometer, caliper or gage.

My invention has the capabilities of use either for measuring small angles or dimensions where a micrometer is ordinarily used, inside or outside measurements where a caliper is ordinarily used, or the larger measurements where the gage is commonly used.

My invention is so designed as to be capable of reconstruction so as to give different capacity for measurements by substituting the parts which perform the measuring operation; being designed and made as hereinbefore pointed out my invention will work a great saving as it takes the place of a large number of separate tools and is so built as to be self-testing as to its accuracy and is designed to be absolutely accurate at all times.

The special and novel phases of the invention herein disclosed will be better understood from reference to the following detailed description which is to be taken in conjunction with the accompanying drawing, wherein—

Figure 1:
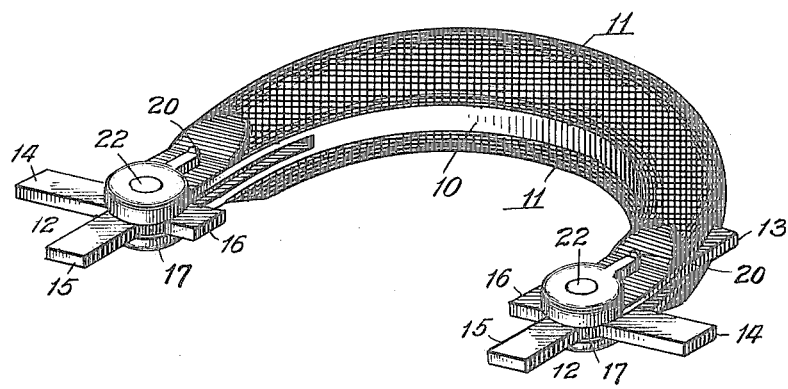
Figure 2:
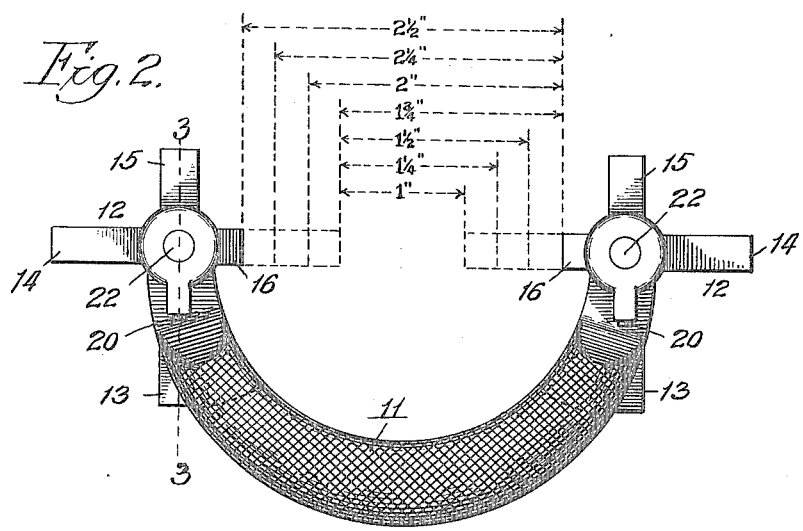
Figure 3:
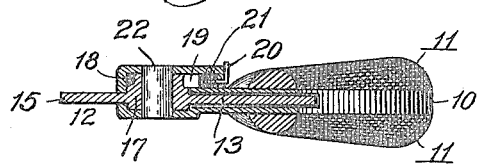
Figure 4:
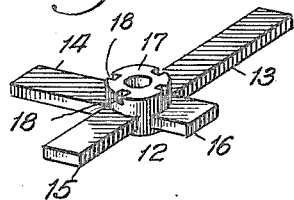

Figure 1 shows my adjustable gage as made ready for use. Fig. 2 is a view illustrating a set of standard sizes or measurements which can be obtained by the use of my adjustable gage. Fig. 3 shows a cross section on the line 3—3 in Fig. 2. Fig. 4 is a detailed view of one of the turret anvils.

In carrying out my invention I first provide a frame 10 of steel which I cover with hard rubber 11 or some analogous substance so that the accuracy of the instrument will not be affected by the heat of the hand or similar conditions. At each of the two ends of the frame I have provided a turret anvil 12 composed of four separate anvils 13, 14, 15, 16, and a hub 17, all of steel. These turret anvils are made so that they can be detached from the frame of the gage and new ones of different sizes supplied, if and when desired, at a moderate cost.

The arrangement of the turret anvils in conjunction with the frame of the gage when in use is shown in Fig. 1, the frame being slotted at the ends so that the turret anvils may revolve, the conjunction of the two being by any satisfactory means consistent with maintaining absolute accuracy of the tool.

I have illustrated in Fig. 4 a form which may be used although I do not wish to be limited to any particular form of means for adjustment and connection of the turret anvils with the frame of the gage. Briefly the form shown consists of notches 18 in the hub of the turret anvil, one corresponding to each separate anvil as shown in Fig. 4; a catch means 19 like that shown in Fig. 3 which, when it engages with the notches 18, may be drawn out by means of the lever 20. I have provided, in connection with this locking means, a spring 21 so that when the turret is revolved the catch 19 will automatically engage with the notch 18, disengagement again being secured by means of the lever 20.

In Fig. 2 I have illustrated a set of standard sizes which may be secured in my adjustable gage. It should be remembered, however, that this is illustrative only and that by varying the length of the individual anvils any desired set of sizes may be secured. It should also be remembered that with any set of standard sizes like that illustrated in Fig. 2 it carries with it the possibility of any fractional size between the limits indicated; for example, in the set of standard sizes shown in Fig. 2 there is a range in sizes, between the smallest of one inch and the largest of two-and-one-half inches, of one-and-one-half inch; therefore, if desired, any fractional size between those limits could be procured thus illustrating how my device is adopted for use in almost a limitless number of sizes.

Any means may be used for holding the turret anvil in place in the frame of the gage. I have merely shown the pin 22 as a common expedient. Many other means might be adopted, the only limitation being that the turret must be held perfectly in place so that the absolute accuracy of the tool be preserved at all times under all conditions.

I do not desire to be limited to the details of construction shown.

I have herein disclosed one embodiment of the present invention and am aware that changes in detail may be made without deviating from the spirit of my invention and I desire that the protection herein sought should include such changes and modifications in detail as reasonably may be made within the terms of the appended claims.

Having fully described my invention, what I claim and desire to secure by Letters Patent is:

1. A gage having a main frame, suitable insulating or other covering for the frame, two rotating turrets having a plurality of anvils of varying lengths, a hub for each turret provided with notches, means for engaging with the notches to automatically lock the turrets in exact operative position and means for disengaging the locking means to permit rotation of the turret, substantially as shown and described.

2. A gage having a main frame, suitable insulating or other covering for the frame, two rotating turrets having a plurality of anvils of varying lengths and means for locking and holding the anvils in exact operative position.

In witness whereof, I hereunto subscribe my name to this specification in the presence of two witnesses.

MEL FELLOWS.

Witnesses:
ARTHUR A. HOUSE,
JAMES S. DEMING.